Figure 1:
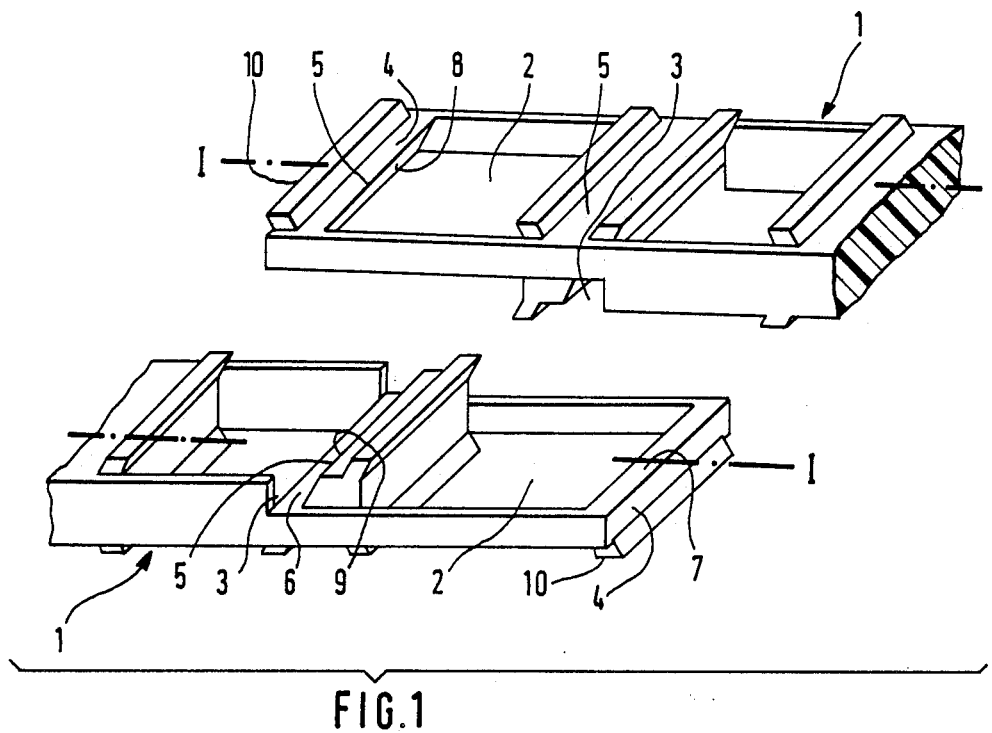

United States Patent [19]

Rabe

[11] Patent Number: 4,961,651
[45] Date of Patent: Oct. 9, 1990

[54] CAGE FOR ROLLING BEARINGS
[75] Inventor: Jürgen Rabe, Aurachtal, Fed. Rep. of Germany
[73] Assignee: INA Walzlager Schaeffler KG, Fed. Rep. of Germany
[21] Appl. No.: 348,403
[22] Filed: May 8, 1989
[30] Foreign Application Priority Data Jun. 22, 1988 [DE] Fed. Rep. of Germany ....... 3821037

[51] Int. Cl.⁵ .............................................. F16C 29/04
[52] U.S. Cl. ...................................... 384/51; 384/577
[58] Field of Search ............... 384/573, 577, 578, 523, 384/51; 277/220, 221

[56] References Cited
U.S. PATENT DOCUMENTS 1,353,082  9/1920  Stehle et al. ........................ 277/221
4,239,304  12/1980  Wakunami ........................ 384/573
4,397,507  8/1983  Kraus et al. ........................ 384/577

Primary Examiner—Lenard A. Footland
Attorney, Agent, or Firm—Bierman & Muserlian

[57] ABSTRACT

A cage for rolling bearings consisting of individual cage elements provided with rolling element pockets whereby the individual cage elements, at their ends in the region of at least one rolling element pocket have a reduced constructional height where they are placed on one another to overlap in the axial direction and are joined together in this region, characterized by the fact that in the region of the reduced constructional height, cut-outs and lugs are provided which engage with one another in a form fit when these regions are placed on one another and made to overlap.

4 Claims, 4 Drawing Sheets

CAGE FOR ROLLING BEARINGS

STATE OF THE ART

British Patent No. 972,676 describes plastic cages for roller bearings in which profiled strips with recesses for rolling elements and one-sided rolling element retention are placed with their flat surfaces on one another to overlap in the axial direction and joined together. This type of construction has the advantage that, with a corresponding number of identical components, a cage of any length can be economically produced.

Practical employment of such cages, however, shows that they can withstand only moderate tensile and compressive loads in the axial direction which fact can be particularly ascribed to the shear stresses arising thereby in the regions of the joints. This is also the reason why only a few methods of joining can be used. For moderate axial loads, an adhesive bond is, no doubt adequate, but for higher loads, mechanical joining methods such as riveting or the like are necessary. In addition, for the assembly of such cages made of profiled strips, mechanical means for aligning the individual cage elements and in particular, for centering the rolling element pockets are required.

OBJECTS OF THE INVENTION

It is an object of the invention to provide a cage for rolling bearings consisting of individual cage elements which are placed on one another to overlap and are joined together whereby the joints are able to resist high loads, different methods of joining can be employed and the individual cage elements align themselves automatically during assembly and center the rolling element pockets.

This and other object and advantages of the invention will become obvious from the following detailed description.

THE INVENTION

The novel cage of the invention for rolling bearings consisting of individual cage elements provided with rolling element pockets whereby the individual cage elements, at their ends in the region of at least one rolling element pocket have a reduced constructional height where they are placed on one another to overlap in the axial direction and are joined together in this region is characterized by the fact that in the region of the reduced constructional height, cut-outs and lugs are provided which engage with one another in a form fit when these regions are placed on one another and made to overlap.

Figure 2:
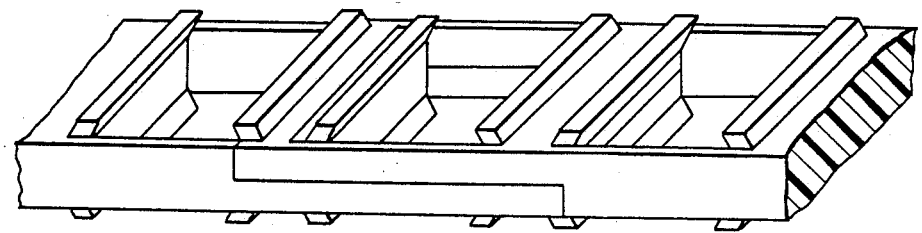
Figure 3:
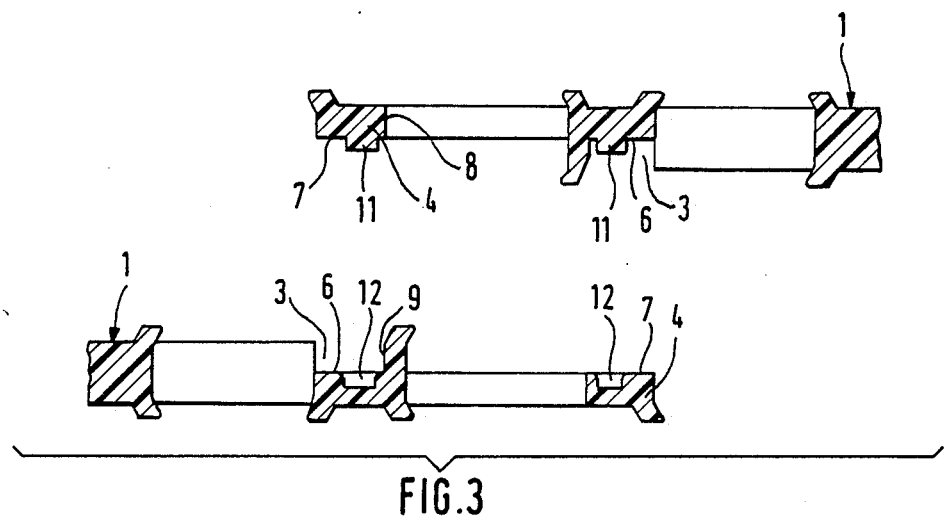
Figure 4:
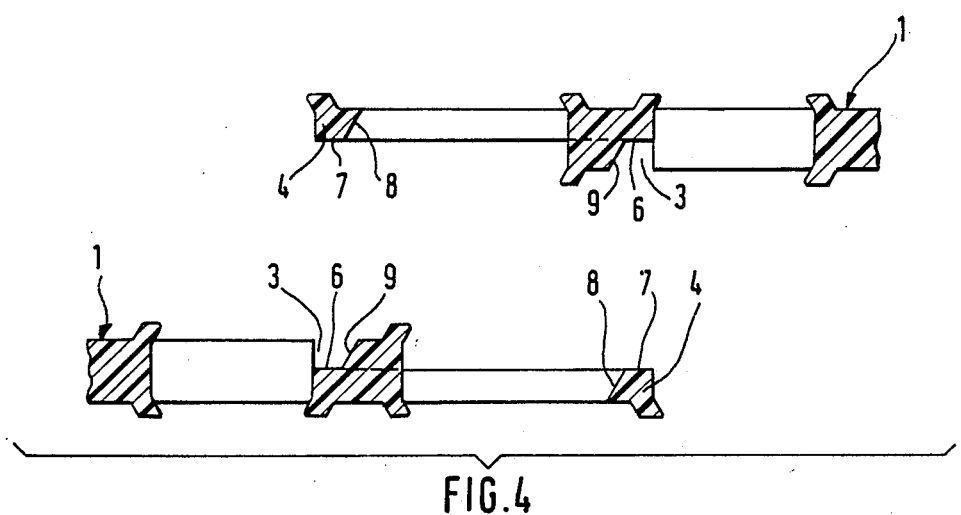
Figure 5:
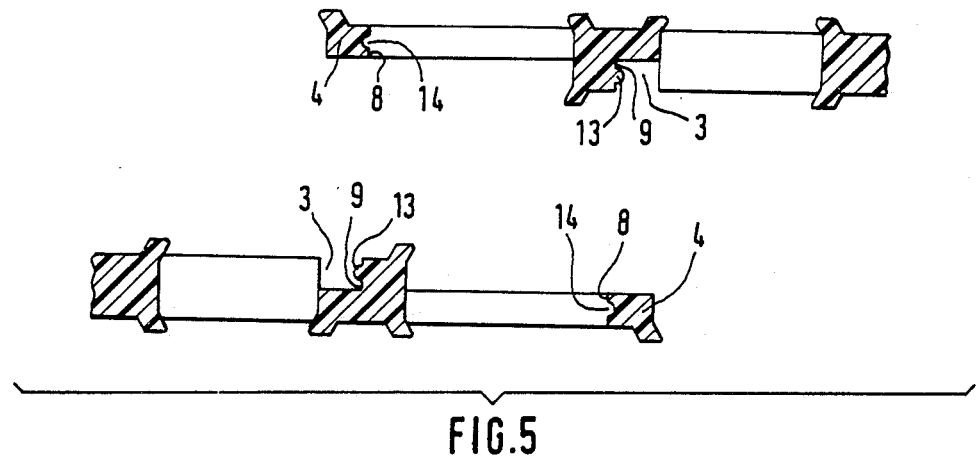
Figure 6:
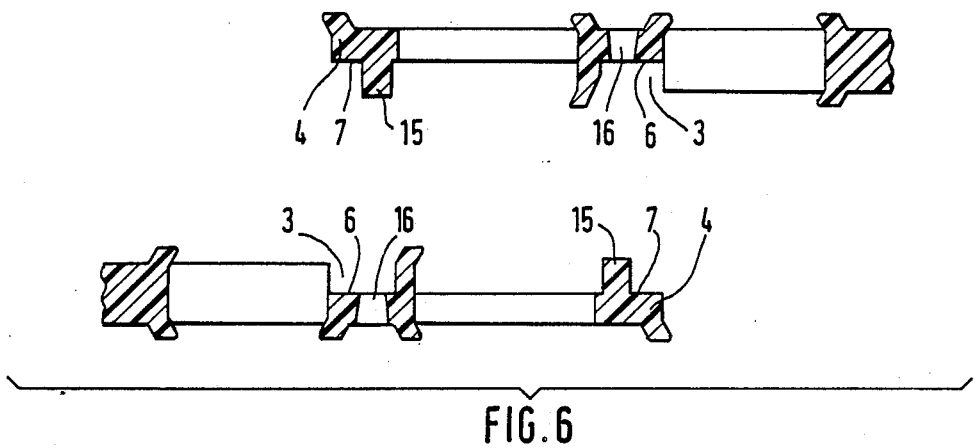
Figure 7:
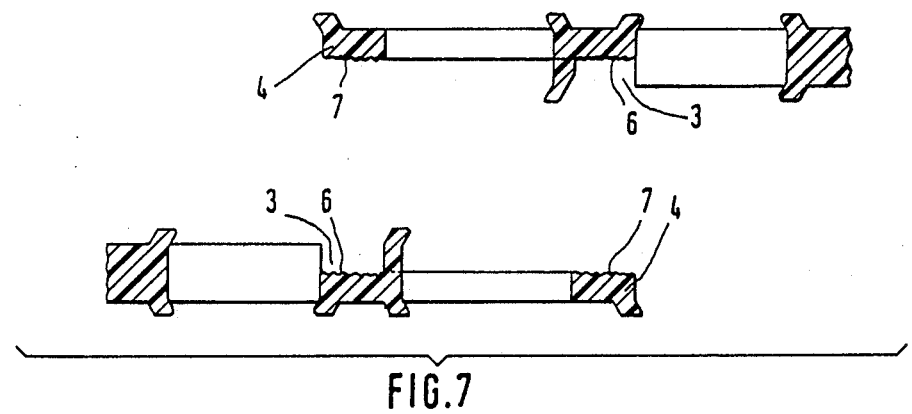
Figure 8:
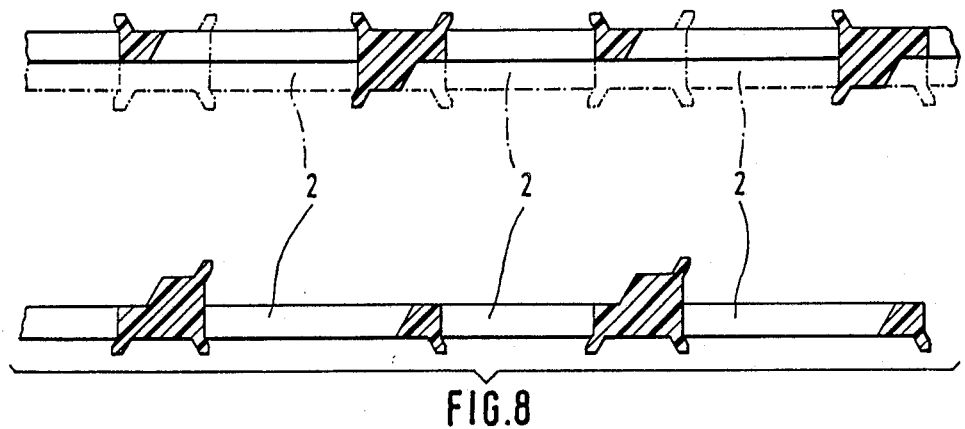

The form fit is sufficient to transfer tensile and compressive forces in the axial direction between the individual cage elements. If additionally, in a preferred manner, the individual cage elements are joined together by means of snap joints, welding, ultrasonic welding or ultrasonic riveting in the region of the lugs and cut-outs, the joints are relieved of the maximum tensile and compressive stresses. For this reason, preferred embodiment of the invention the lugs and the cut-outs extend across the entire width of the crossbar of the pocket to provide as large a surface as possible for the form fit. It is also obvious to design the lugs and cut-outs so that the individual cage elements align themselves and thus center the rolling element pockets. Referring now to the drawings:

FIG. 1 is a perspective view of the cage ends of two individual cage elements before assembly, FIG. 2 is a perspective view of the assembled cage, FIG. 3 is a cross-section across the cage ends for a non-centering weld joint, FIG. 4 is a cross-section across the cage ends for a self-centering weld joint, FIG. 5 is a cross-section across the cage ends for a self-centering snap joint, FIG. 6 is a cross-section across the cage ends for a self-centering joint made by ultrasonic riveting, FIG. 7 is a cross-section of the cage ends for a self-centering adhesive bond and FIG. 8 is a cross-section across the cage ends for a self-centering weld joint with reduced constructional height in the region of several pockets.

In FIG. 1, the associated ends of the individual cage elements (1) of the invention are shown. in the region of a rolling element pocket (2), the ends are reduced in their constructional height and provided with cut-outs (3) and lugs (4), which in this case extend across the entire width of the crossbars (5) and engage with one another in a form fit when assembled. The joint is made preferably in the region of the surface (6) at the cut-out (3) and the surface (7) at the lug (4). By providing corresponding inclinations of the surface (8) at the cut-out (3) and the durface (9) at the lug (4), the individual cage elements (1) are aligned and the rolling element pockets (2) are centered. Since the rolling elements pockets (2) are partially delimited by the lugs (4), rolling element retainers (10) are provided at the lugs (4).

FIG. 2 shows a perspective view of individual cage elements assembled to form a cage from which it is clear how, by the fact that the lugs (4) and the cut-outs (3) engage with one another in a form fit, a joint is obtained which is resistant to tensile as well as compressive loads in the axial direction.

FIG. 3 is a cross-sectional view of the ends of two individual cage elements along the line I-I of FIG. 1 and shows the design of individual cage element ends for a weld joint without self-centering. The design is essentially the same as that of FIG. 1, however, in the region of the surface (6) of the cut-out (3) and the durface (7) of the lug (4), pegs (11) and grooves (12) are provided. For assembling, the pegs (11) are heated and pressed into the grooves (12) so that after cooling, a strong weld joint is obtained. The surface (8) at the lug (4) and the surface (9) at the cut-out (3) in this example, are not adapted in shape to one another and therefore mechanical aligning of the individual cage elements is necessary.

FIG. 4 is a cross-sectional view of the ends of two individual cage elements for a weld joint with self-centering. The weld joint is made by input of energy at the surfaces (7) of the lugs (4) and the surfaces (6) at the cut-outs (3). By the provision of corresponding inclinations of the surfaces (8) at the lugs (4) and the surfaces (9) at the cut-outs (3), the individual cage elements (1) are aligned and the rolling element pockets are centered.

FIG. 5 is a cross-sectional view of the ends of individual cage elements for a self-centering snap joint wherein the surface (8) at the lugs (4) and the surfaces (9) at the cut-outs (3) have the double function of forming the joint as well as that of centering. The spring (13) snaps into the groove (14) so that the individual cage elements cannot come apart.

FIG. 6 is a cross-sectional view of the ends of individual cage elements for a joint made by ultrasonic riveting. For assembling, the pegs (15) at the surfaces (7) of the lugs (4) are introduced into the bore (16) which is provided in the surface (6) and runs conically towards the outside. The pegs are then softened by ultrasonic heating and upset so that the conical bore (16) is completely filled.

FIG. 7 shows a corresponding view of the ends of individual cage elements for an adhesive bond wherein the adhesion surfaces (6,7) are arranged in the longitudinal direction. Because the lugs (4) and the cut-outs (3) engage with one another, no shear loading of the adhesive bonds takes place when the cage is subjected to tensile and compressive loads in the axial direction, with the result that even adhesive bonded individual cage elements can be relatively highly loaded.

FIG. 8 is a cross-sectional view of cage elements for a self-centering weld joint in which the region of reduced constructional height extends across several rolling element pockets (2). The design is essentially ajuxtaposition of several joints of the type already shown in FIG. 4. Similar overlapping of several pockets can also be employed with the other types of joints dsscribed above.

Various modifications of the cage of the invention may be made without departing from the spirit or scope thereof and it is to be understood that the invention is intended to be limited only as defined in the appended claims.

What I claim is:

1. A cage for rolling bearings comprising individual cage elements provided with rolling element pockets whereby the individual cage elements, at their ends in the region of at least one rolling element pocket have a reduced constructional height where they are placed on one another to overlap in the axial direction in the direction of movement of the rolling elements and are joined together in this region, wherein cut-outs and lugs are provided in the region of the reduced constructional height and engage with one another in a form fit when these regions are placed on one another and made to overlap, characterized in that both the cut-outs and the lugs extend across the entire width of the crossbars of the cage.

2. The cage for rolling bearings of claim 1 wherein the cut-outs and the lugs are designed so that they align the individual cage elements and center the rolling element pockets.

3. A cage for rolling bearings of claim 1 wherein the joint, made in particular by welding, snap joining or ultrasonic riveting lies in the region of the cut-outs and the lugs.

4. A cage for rolling bearings of claim 1 wherein the lugs partially delimit the rolling element pockets and are provided with rolling element retainers.

* * * * *